United States Patent [19]
Brog

[11] Patent Number: 5,848,584
[45] Date of Patent: Dec. 15, 1998

[54] DEVICE FOR HOLDING AN OUTDOOR COOKING VESSEL OVER A CAMPFIRE

[76] Inventor: Ernest Brog, 212 S. 600 East, Alpine, Utah 84004

[21] Appl. No.: 863,344

[22] Filed: May 27, 1997

[51] Int. Cl.$^6$ ...................................................... F24B 3/00
[52] U.S. Cl. .......................... 126/30; 120/9 B; 120/25 A; 120/29; 120/40; 99/339; 248/156
[58] Field of Search ............................. 126/30, 29, 25 A, 126/9 B, 40, 333, 298; 99/339, 340; 248/156, 295.1

[56] References Cited

U.S. PATENT DOCUMENTS

| | | | |
|---|---|---|---|
| 699,066 | 4/1902 | Baskett | 248/124.1 |
| 2,173,024 | 9/1939 | Park | 126/30 |
| 2,844,139 | 7/1958 | Lucas | 126/30 |
| 3,111,123 | 11/1963 | Le Fort | 126/506 |
| 3,455,291 | 7/1969 | Glass | 126/137 |
| 4,607,608 | 8/1986 | Allred et al. | 126/30 |
| 4,979,490 | 12/1990 | Nudo et al. | 126/30 |
| 5,447,096 | 9/1995 | Burge et al. | 99/339 |

*Primary Examiner*—Larry Jones
*Attorney, Agent, or Firm*—Terry M. Crellin

[57] ABSTRACT

A device for holding an outdoor cooking vessel over a campfire has an elongate post that is pushed into ground adjacent to the campfire. An elongate tubular member has an opening extending through top and bottom surfaces of the tubular member. The elongate post fits snugly through the opening. A second elongate tubular member is pivotally attached to the first tubular so that the second tubular member can pivot upwardly from a distal end of the first tubular member. A first end of an elongate plate is attached to an underside of the the end of the second tubular member so that the second end of the plate extends along an underside of the first tubular member and slightly beyond a second opening through the first tubular member. An elongate threaded rod is threaded through a nut on the first tubular member, with the threaded rod extending through the second opening so that a distal end of the threaded rod can be advanced into contact with the elongate plate and force the elongate plate to move away from the first tubular member to force the second tubular member to pivot upwardly. An outdoor cooking vessel is engaged in the second end of the second tubular member, with the vessel being supported in cantilever fashion from the second end of the tubular member.

4 Claims, 2 Drawing Sheets

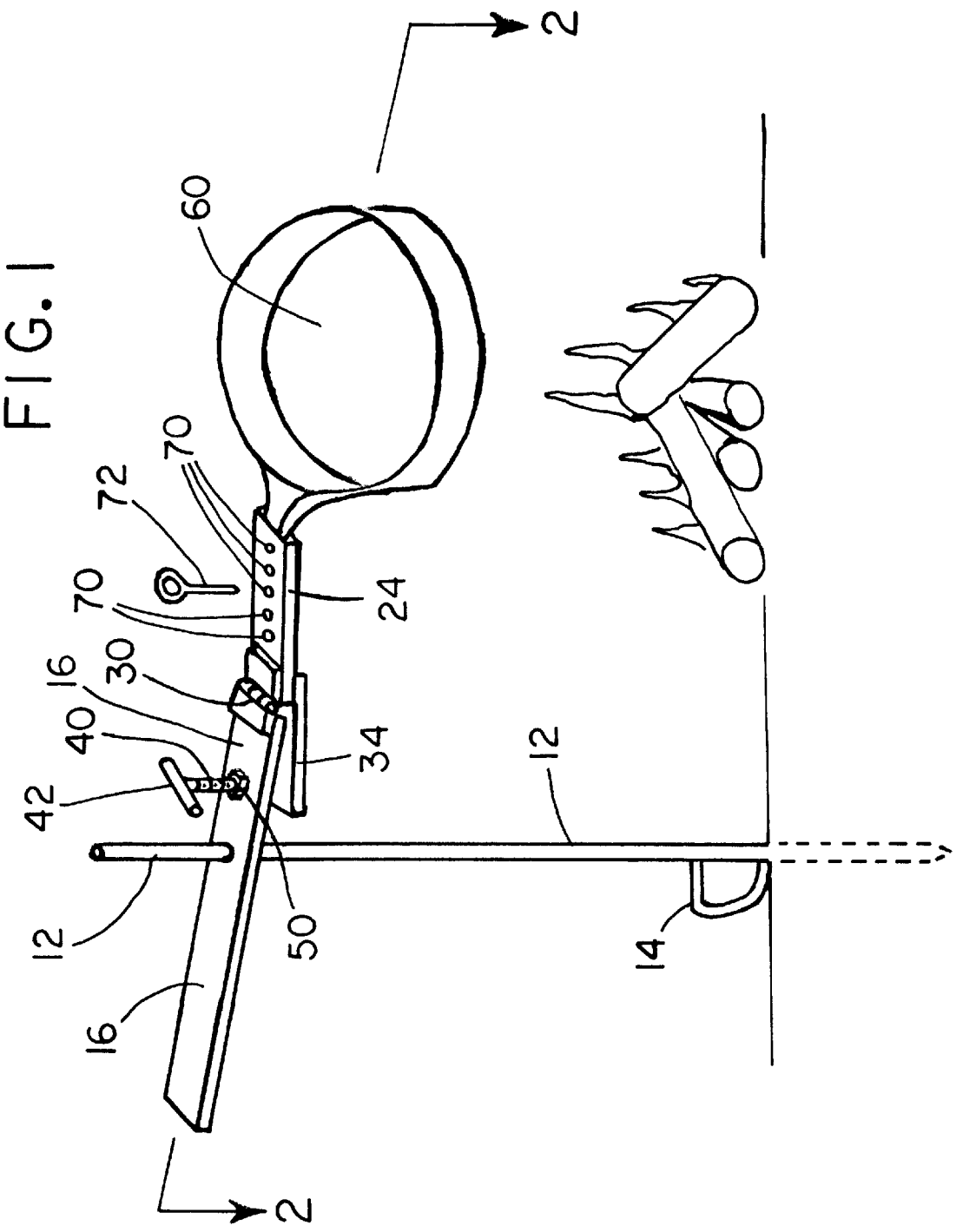

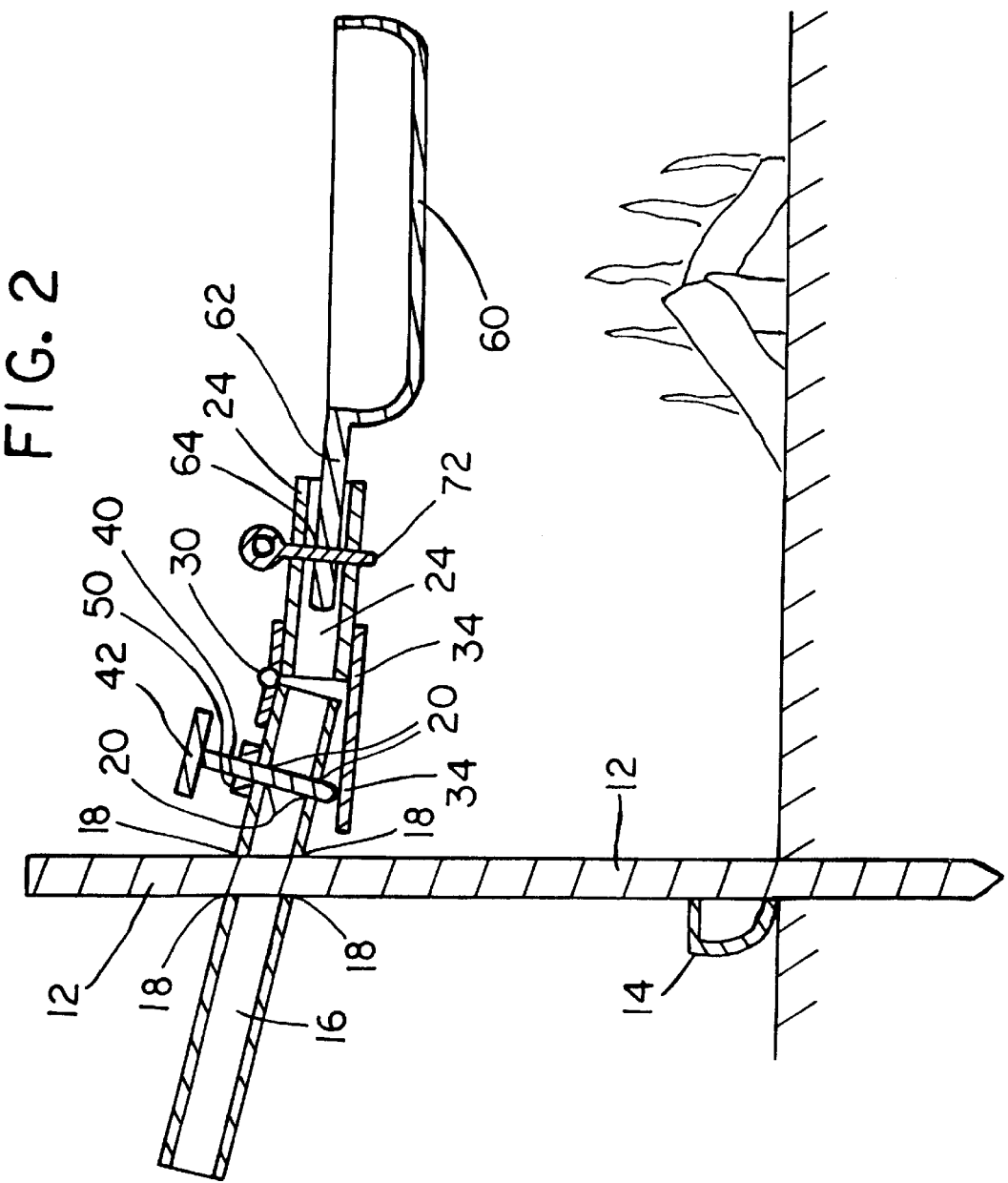

DEVICE FOR HOLDING AN OUTDOOR COOKING VESSEL OVER A CAMPFIRE

BACKGROUND OF THE INVENTION

1. Field of the Invention

The present invention relates to post mounted campfire grilles, and in particular to a device which is mounted on a post and which supports a outdoor cooking vessel over a campfire, with the device being capable of adjusting the elevation of the outdoor cooking vessel as well as leveling the outdoor cooking vessel.

2. State of the Art

Various devices are known in the art for supporting cooking grilles over a campfire from a portable post or stand. Representative devices are shown in the following U.S. Pat. Nos.: 2,324,233; 2,522,223; 2,844,139; 3,095,869; 3,359,887; 3,526,217; 4,117,825; 4,607,608; and 4,979,490. No known devices have the ability to support an outdoor cooking vessel by the handle of the vessel over a campfire so that the position of the cooking vessel can be adjusted both vertically and horizontally in a fashion as disclosed in the present invention.

BRIEF DESCRIPTION OF THE INVENTION

In accordance with the present invention, a novel device is provided that is capable of supporting an outdoor cooking vessel in cantilever fashion over a campfire. The device includes an elongate post that is driven into the ground adjacent to a campfire, with the post extending substantially vertically upward from the ground. An elongate tubular member has an opening intermediate its ends, with the opening extending through the tubular member from an upper surface thereof to a lower surface. The opening is sized such that the elongate post fits snugly through the opening. The tubular member can be manually moved along the elongate post to any vertical position on the post. When the tubular member is manually positioned at a desired location on the post and then released, the opening in the tubular member locks in place on the tubular member in a wedging action that prevents the tubular member from sliding down the post. Until the tubular member is again manually manipulated, the tubular member remains firmly in place on the elongate post.

One end of the tubular member has a second elongate tubular member pivotally attached thereto. The upper surfaces of the second tubular member and the initial tubular member are pivotally attached together about a pivot axis that is substantially perpendicular to the longitudinal axes of each of the tubular members. The pivot axis is located adjacent to or slightly above the upper surfaces of both of the tubular members so that the second tubular member can be pivoted upwardly from a rest position in which it extends longitudinally from the one end of the initial tubular member in substantial alignment with the initial tubular member.

A handle of an outdoor cooking vessel is received in the distal end of the second tubular member so that the cooking vessel projects outwardly from the second tubular member and over the campfire. A mechanical adjusting mechanism is provided for adjusting the pivot angle between the two tubular member so that the cooking vessel is maintained in a level disposition over the campfire.

Additional objects and features of the invention will become apparent from the following detailed description, taken together with the accompanying drawings.

THE DRAWINGS

A preferred embodiment of a device in accordance with the present invention, representing the best mode presently contemplated of carrying out the invention, is illustrated in the accompanying drawings in which:

FIG. 1 is a pictorial representation of one preferred embodiment of a device of the present invention; and FIG. 2 is horizontal cross section taken along line 2—2 of FIG. 1.

DETAILED DESCRIPTION OF THE ILLUSTRATED EMBODIMENT

A preferred embodiment of a device for holding an outdoor cooking vessel over a campfire in accordance with the present invention is illustrated in the drawings. The device is highly advantageous in that the cooking vessel can be adjusted up and down over the campfire. In addition, the cooking vessel can also be maintained in a level disposition over the campfire at any of the vertical positions.

The device comprises an elongate post 12 that can be pushed into ground adjacent to the campfire so that post 12 extends upwardly from the ground. The post 12 is advantageously made of a metal rod having a sharp end which can be inserted into the ground using a foot pad 14 which is attached to the post 12.

A first elongate tubular member 16 is adapted to slide up and down along the elongate post 12 once the post has been inserted into the ground. An opening 18 is provided in the tubular member 16, with the opening 18 extending through top and bottom surfaces of the first tubular member 16. The opening 18 has an axis that is substantially perpendicular with a longitudinal axis of the first tubular member 16. The opening 18 further has a size such that the elongate post 12 will fit snugly through the opening 18. The opening 18 is preferably spaced from the first end of the first tubular member 16 by a distance of between about 3 inches and 6 inches, and the entire length of the tubular member 16 is preferably from about 8 inches to about 16 inches. The tubular member 16 is advantageously formed of square or rectangular metal tubing, such as a square or rectangular steel tube.

When the first tubular member 16 is manipulated manually, it can be slid back and forth along the elongate post 12, with the post 12 sliding through the opening 18. When the first tubular member 16 is manually moved to a selected position along the elongate post 12 and then released, the weight of the cantilevered portion of the elongate tubular member 16 causes the opening 18 to bind on the elongate post 12 in a pinching or wedging action that prevents the first tubular member 16 from sliding downwardly on the elongate post 12.

A second opening 20 extends through top and bottom surfaces of the first tubular member 16, with the second opening 20 preferably having an axis that is substantially parallel to the axis of the first opening 18. The second opening 20 is located between the first end of the first tubular member 16 and the first opening 18.

A first end of a second elongate tubular member 24 is pivotally attached to the first end of the first tubular member 16. In its rest position, the second tubular member 24 extends from the first end of the first tubular member 16 so as to be substantially coaxial with the first tubular member 16. The second tubular member 24 preferably has a length of from about 4 inches to about 10 inches. The second tubular member 24 is advantageously formed of square or rectangular metal tubing, such as a square or rectangular steel tube.

A hinge 30 is provided to pivotally attach the first end of the second tubular member 24 to the first end of the first tubular member 16. As illustrated, the hinge 30 is positioned along the upper surfaces of the first and second tubular members 16 and 24. The pivot axis of the hinge 30 is substantially perpendicular to the longitudinal axis of the first tubular member 16.

When the first tubular member 16 extends laterally from the elongate post 12, the first end of the first tubular member 16 is disposed in a position in which it is spaced a horizontal distance from the second end of the first tubular member 16. In that position, the second tubular member 24 can pivot upwardly from a rest position in which the second tubular member 24 is in substantial linear alignment with the first tubular member 16 to a second position in which the second tubular member 24 slants upwardly at an acute angle with the longitudinal axis of the first tubular member 16.

A first end of an elongate plate 34 is attached to an underside of the first end of the second tubular member 24 so that the second end of the plate 34 extends along an underside of the first tubular member 16 and slightly beyond the second opening 20 in the first tubular member 16 when the second tubular member 24 is in substantially linear alignment with the first tubular member 16. The plate 34, as will be described further hereinafter, is used to level a cooking vessel over the campfire.

An elongate threaded rod 40 is provided having a handle 42 at one end thereof. As illustrated, the handle 42 is advantageously formed by a short piece of unthreaded rod that is welded to the upper end of the elongate threaded rod 40. Thread engagement means are associated with the second opening 20 in the first tubular member 16. As illustrated, the tread engagement means preferably comprises a threaded nut 50 that is attached as by welding to the upper surface of the first tubular member 16 so that the threaded nut 50 is coaxial with the second opening 20 in the first tubular member 16.

The threaded rod 40 engages the threaded nut 50, with the threaded rod extending through the second opening 20 so that a distal end of the threaded rod 40 can be advanced into contact with the elongate plate 34 and force the elongate plate 34 to move away from the first tubular member 16. The elongate plate 34 in turn forces the second tubular member 24 to pivot upwardly. The second end of the second tubular member 24 is open so that an end of a handle 62 of an outdoor cooking vessel 60 can be engaged in the open second end of the second tubular member 24, with the vessel 60 being supported in cantilever fashion from the second end of the tubular member 24. As illustrated in the drawings, it is advantageous to provide a plurality of spaced apart holes 70 along the length of the second tubular member 24. Each hole 70 extends in an essentially straight line through the top and bottom surfaces of the second tubular member 24. A retainer pin 72 is inserted in any of the holes 70 in the second tubular member 24 to extend through the second tubular member 24 and engage an opening 64 in the handle 62 of the cooking vessel 60 to securely hold the handle 62 of the cooking vessel 60 within the open end of the second tubular member 24.

The device is easily used and quickly set up alongside a campfire. The elongate post 12 is pushed into the ground so that the post 12 extends upwardly from a side edge of the campfire. The pivotally connected first and second tubular members 16 and 24 are attached to the post 16 by sliding the opening 18 in the first tubular member 16 down along the post 12 to a selected height above the campfire. The first tubular member 16 will stay firmly in place on the post 12 and will not further slide along the post after the tubular member 16 has been manually positioned at its selected position.

A cooking vessel 60 is attached to the distal end of the second tubular member 24 by sliding the handle 62 within the open end of the second tubular member 24. The retainer pin 72 is engaged through the selected hole of the series of holes 70 in the second tubular member 24 so that the retainer pin passes through the opening 64 in the handle 62 of the cooking vessel 60 thereby locking the handle 62 in place in the open end of the second tubular member 24. The first tubular member 24 is then swung around the post 12 so that the cooking vessel 60 is positioned over the campfire.

The weight of the cooking vessel 60 will often cause the cooking vessel 60 to slant downwardly as it is being used. The cooking vessel 60 can quickly and readily be leveled at any time during time when it is being used to cook over the campfire. The leveling is done by turning the handle 42 on the threaded rod 40 so as to advance the distal end of the rod 40 into engagement with the second end of the elongate plate 34. The second end of the elongate plate 34 is forced downwardly, and the elongate plate in turn forces the second tubular member 24 to pivot upwardly. The cooking vessel 60 is in turn rotated slightly so as to be leveled over the campfire.

Although a preferred embodiment of the device of the present invention has been illustrated and described, it is to be understood that the present disclosure is made by way of example and that various other embodiments are possible without departing from the subject matter coming within the scope of the following claims, which subject matter is regarded as the invention.

I claim:

1. A device for holding an outdoor cooking vessel over a campfire, wherein said cooking vessel can be adjusted up and down over the campfire and can also be maintained in a level disposition over the campfire at any of the vertical positions relative to the campfire, said device comprising an elongate post that can be pushed into ground adjacent to the campfire, with the post extending upwardly from the ground;

a first elongate tubular member having a first and second end, and further having a length of from about 8 inches to 16 inches;

an opening that extends through top and bottom surfaces of said first tubular member, said opening having an axis that is substantially perpendicular with a longitudinal axis of said first tubular member, said opening further having a size such that said elongate post will fit snugly through said opening, said opening further being spaced from said first end of said first tubular member by a distance of between about 3 inches and 6 inches;

a second opening that extends through top and bottom surfaces of said first tubular member, said second opening being located between said first end of said first tubular member and said first opening;

a second elongate tubular member having first and second ends, and further having a length of from about 4 inches to about 10 inches;

means for pivotally attaching said first end of said second tubular member to said first end of said first tubular member so that when said first tubular member is disposed in a position in which the first end of said first tubular member is spaced a horizontal distance from said second end of said first tubular member, said second tubular member can pivot upwardly from a first position in which said second tubular member is in substantial alignment with said first tubular member to a second position in which said second tubular member slants upwardly at an acute angle with a longitudinal axis of said first tubular member;

an elongate plate having first and second ends, said first end of said plate being attached to an underside of said first end of said second tubular member so that said second end of said plate extends along an underside of said first tubular member and slightly beyond said second opening in said first tubular member when said second tubular member is in substantial alignment with said first tubular member;

an elongate threaded rod having a handle at one end thereof;

thread engagement means associated with said second opening in said first tubular member, said threaded rod engaging said thread engagement means, with said threaded rod extending through said second opening so that a distal end of said threaded rod can be advanced into contact with said elongate plate and force said elongate plate to move away from said first tubular member, whereby said elongate plate forces said second tubular member to pivot upwardly; and said second end of said second tubular member is open so that an end of a handle of an outdoor cooking vessel can be engaged in the open second end of said second tubular member, with the vessel being supported in cantilever fashion from the second end of said tubular member.

2. A device in accordance with claim 1 wherein said first and second tubular members are square or rectangular steel tubes.

3. A device in accordance with claim 2 wherein a plurality of spaced apart holes are provided along the length of said second tubular member, with each hole extending in an essentially straight line through the top and bottom surfaces of said second tubular member; and a retainer pin that can be inserted in any of the holes in said second tubular member to extend through said second tubular member and engage an opening in the handle of the cooking vessel to securely hold the handle of the cooking vessel within said second tubular member.

4. A device in accordance with claim 3 wherein the thread engagement means comprises a threaded nut that is attached to the upper surface of the first tubular member so that the threaded nut is coaxial with said second opening in said first tubular member.

* * * * *